(12) United States Patent
Minami et al.

(10) Patent No.: US 8,661,675 B2
(45) Date of Patent: Mar. 4, 2014

(54) PROCESS FOR PRODUCING MEMBER FOR HEAT EXCHANGER AND MEMBER FOR HEAT EXCHANGER

(75) Inventors: Kazuhiko Minami, Oyama (JP); Ichiro Iwai, Oyama (JP)

(73) Assignee: Showa Denko K.K., Tokyo (JP)

( * ) Notice: Subject to any disclaimer, the term of this patent is extended or adjusted under 35 U.S.C. 154(b) by 841 days.

(21) Appl. No.: 12/808,932

(22) PCT Filed: Dec. 11, 2008

(86) PCT No.: PCT/JP2008/072565
§ 371 (c)(1),
(2), (4) Date: Sep. 14, 2010

(87) PCT Pub. No.: WO2009/078342
PCT Pub. Date: Jun. 25, 2009

(65) Prior Publication Data
US 2011/0192581 A1   Aug. 11, 2011

(30) Foreign Application Priority Data
Dec. 18, 2007 (JP) .................................. 2007-325519

(51) Int. Cl.
*B05D 1/12* (2006.01)
*B23K 101/14* (2006.01)
*B23K 103/10* (2006.01)

(52) U.S. Cl.
USPC ................. 29/890.043; 29/890.054; 228/183; 228/248.1; 427/376.8

(58) Field of Classification Search
USPC ...................... 29/890.038, 890.043, 890.054; 228/183, 248.1, 248.5, 207, 223, 209, 228/210, 208; 427/376.6, 376.7, 376.8
See application file for complete search history.

(56) References Cited

U.S. PATENT DOCUMENTS

| | | | |
|---|---|---|---|
| 4,901,908 A * | 2/1990 | Negura et al. ................. | 228/183 |
| 4,989,775 A | 2/1991 | Shimajiri et al. | |
| 5,072,789 A * | 12/1991 | Usui et al. .................. | 165/134.1 |
| 5,464,146 A * | 11/1995 | Zaluzec et al. ................ | 228/208 |
| 6,059,174 A * | 5/2000 | Kojima et al. ................ | 228/183 |

(Continued)

FOREIGN PATENT DOCUMENTS

| | | |
|---|---|---|
| JP | 1-192467 A | 8/1989 |
| JP | 07-310162 A | 11/1995 |

(Continued)

OTHER PUBLICATIONS

Official Communication issued in corresponding Japanese Patent Application No. 2008-307354, mailed on Feb. 19, 2013.

(Continued)

*Primary Examiner* — David Bryant
*Assistant Examiner* — Jason L Vaughan
(74) *Attorney, Agent, or Firm* — Keating & Bennett, LLP

(57) ABSTRACT

In supplying flux to a brazing heat exchanger member, a given amount of the flux is stably adhered to brazing portions without interposing any substance which becomes unnecessary for the brazing such as binder. In manufacturing a heat exchanger member, particles containing flux are injected to a surface of a substrate made of aluminum or its alloy at a temperature lower than a melting point of the flux by 30° C. or more to collide against the surface at an average speed of 100 m/sec or higher to thereby mechanically adhere the particles thereto.

10 Claims, 3 Drawing Sheets

(56) References Cited

U.S. PATENT DOCUMENTS

| | | | |
|---|---|---|---|
| 6,153,021 A | 11/2000 | Suzuki et al. | |
| 6,193,140 B1 * | 2/2001 | Suzuki et al. | 228/183 |
| 6,317,913 B1 | 11/2001 | Kilmer et al. | |
| 6,344,237 B1 | 2/2002 | Kilmer et al. | |
| 6,733,598 B2 * | 5/2004 | Swidersky et al. | 148/23 |
| 6,743,468 B2 * | 6/2004 | Fuller et al. | 427/191 |
| 6,749,901 B1 * | 6/2004 | Ghosh et al. | 427/448 |
| 6,821,558 B2 * | 11/2004 | Zhao et al. | 427/202 |
| 6,997,371 B2 * | 2/2006 | Shabtay | 228/183 |
| 7,032,808 B2 * | 4/2006 | Shabtay | 228/183 |
| 7,401,724 B2 * | 7/2008 | Swidersky et al. | 228/207 |
| 8,113,414 B2 * | 2/2012 | Yamada | 228/183 |
| 2002/0168466 A1 | 11/2002 | Tapphorn et al. | |
| 2003/0071110 A1 | 4/2003 | Swidersky et al. | |
| 2005/0006065 A1 | 1/2005 | Katsumata et al. | |
| 2005/0076506 A1 * | 4/2005 | Kanada | 29/890.054 |

FOREIGN PATENT DOCUMENTS

| | | |
|---|---|---|
| JP | 08-157212 A | 6/1996 |
| JP | 9-29487 A | 2/1997 |
| JP | 9-85483 A | 3/1997 |
| JP | 2000-063970 A | 2/2000 |
| JP | 2002-538006 A | 11/2002 |
| JP | 2003-512179 A | 4/2003 |
| JP | 3603710 B2 | 12/2004 |
| JP | 2006-257549 A | 9/2006 |

OTHER PUBLICATIONS

Official Communication issued in International Patent Application No. PCT/JP2008/072565, mailed on Mar. 17, 2009.

Official Communication issued in corresponding European Patent Application No. 08861961.4, mailed on Aug. 1, 2012.

* cited by examiner

PROCESS FOR PRODUCING MEMBER FOR HEAT EXCHANGER AND MEMBER FOR HEAT EXCHANGER

TECHNICAL FIELD

The present invention relates to a method of manufacturing a heat exchanger member which is used, for example, as a structural member for an aluminum heat exchanger to be manufactured by brazing, especially as a member required to have brazeability, and also relates to a heat exchanger manufactured by the method.

BACKGROUND ART

In manufacturing an aluminum heat exchanger, there are a number of brazing portions and flux is applied to those brazing portions.

As a method of supplying flux to a surface of an aluminum member, a method of applying flux suspended in water has been conventionally employed. However, in supplying the flux by this method, it is required to provide a step for vaporizing the water content before the brazing, and the flux suspension hardly adheres to uneven portions and curved portions and therefore it was difficult to supply a given amount of flux to those portions.

To solve the aforementioned problems, a technology for improving the flux adhesive property by using flux composition containing flux and binder that resolves and volatilizes at the time of brazing (Patent Document 1) and a technology for causing flux adherence by static electricity (Patent Document 2) have been proposed.

Patent Document 1: Japanese Unexamined Laid-opened Patent Application Publication No. H09-29487
Patent Document 2: Japanese Patent No. 3603710

DISCLOSURE OF THE INVENTION

Problems to be Solved by the Invention

However, in the method using binder, there is a problem that the binder contaminates the brazing furnace during the brazing operation. On the other hand, in the method of causing flux adherence by static electricity, there is a problem that the adhesive strength is too weak to cause dropping of flux during the handling.

Means for Solving the Problems

The present invention was made in view of the aforementioned problems, and aims to provide a method of manufacturing a heat exchanger member in which a given amount of flux can be stably adhered to brazing portions to obtain excellent brazeability without interposing any substance that would be unnecessary at the time of brazing such as binder.

The method of manufacturing a heat exchanger member, a method of manufacturing a heat exchanger, and a heat exchanger member according to the present invention have the following structure [1] to [16].

[1] A method of manufacturing a heat exchanger member, characterized in that particles containing at least flux are injected to a surface of a substrate made of aluminum or its alloy at a temperature lower than a melting point of the flux by 30° C. or more to collide against the surface at an average speed of 100 m/sec or higher to cause mechanical adhesion of the particles to the surface.

[2] The method of manufacturing a heat exchanger member as recited in the aforementioned Item 1, wherein an average particle size of the injection flux particles is 3 to 25 μm.

[3] The method of manufacturing a heat exchanger member as recited in the aforementioned Item 1 or 2, wherein an average collision speed of the flux particles is 100 to 500 m/sec.

[4] The method of manufacturing a heat exchanger member as recited in any one of the aforementioned Items 1 to 3, wherein an average particle size x (μm) of the injection flux particles and an average collision speed y (m/sec) thereof fall within a range satisfying $x \geq 3$, $y \geq 150$, $y \geq 20x-140$, $x \leq 20$, $y \leq 450$, and $y \leq 8.33x+325$.

[5] The method of manufacturing a heat exchanger member as recited in any one of the aforementioned Items 1 to 4, wherein the particles containing at least flux are injected at a temperature lower than the melting point of the flux by 50 to 150° C.

[6] The method of manufacturing a heat exchanger member as recited in any one of the aforementioned Items 1 to 5, wherein a moisture content of the flux particles is 2% or less.

[7] The method of manufacturing a heat exchanger member as recited in any one of the aforementioned Items 1 to 6, wherein the flux is fluoride series flux.

[8] The method of manufacturing a heat exchanger member as recited in the aforementioned Item 7, wherein the flux contains at least one of $KAlF_4$ and $CsF$.

[9] The method of manufacturing a heat exchanger member as recited in any one of the aforementioned Items 1 to 8, wherein the particles containing at least flux is a compound of flux particles and brazing particles.

[10] The method of manufacturing a heat exchanger member as recited in any one of the aforementioned Items 1 to 8, wherein the particles containing at least flux is a compound of flux particles and Zn particles.

[11] The method of manufacturing a heat exchanger member as recited in any one of the aforementioned Items 1 to 8, wherein the particles containing at least flux is a compound of flux particles, brazing particles, and Zn particles.

[12] The method of manufacturing a heat exchanger member as recited in any one of the aforementioned Items 1 to 11, wherein the substrate is an extruded member.

[13] A method of manufacturing a heat exchanger in which tubes and fins are stacked alternately and header tanks are connected to the tubes to form a provisionally assembled core portion, and the provisionally assembled core portion is heated to thereby braze the tubes and the fins, and the tubes and the header tanks, characterized in that
using a member in which particles containing at least flux mechanically are adhered on a surface of a substrate made of aluminum or its alloy by injecting the particles to the surface at a temperature lower than a melting point of the flux by 30° C. or more to collide at an average speed of 100 m/sec or higher, as any one of the tube, the fin, and the header tank, and
brazing is performed by melting the adhered flux by heating for the brazing to activate the surface of the substrate by the molten flux.

[14] A heat exchanger member characterized in that particles containing at least flux is mechanically adhered on an outer surface of a substrate made of aluminum or aluminum alloy.

[15] The heat exchanger member as recited in the aforementioned Item 14, wherein an adhered amount of the flux particles is 0.3 to 30 g/m².

[16] The heat exchanger member as recited in the aforementioned Items 14 or 15, wherein the heat exchanger member is one of a tube, a header tank, and a flange.

Effects of the Invention

According to the method of manufacturing a heat exchanger member as described in the aforementioned item 1, particles containing at least flux can be adhered mechanically. Since the particles containing flux are mechanically adhered to the substrate, a given amount of flux can be stably supplied without causing falling off of the particles during the handling, which enables excellent brazing. Furthermore, since the flux particles are adhered without using any intervening such as binder, no contamination of the brazing furnace occurs.

According to the method of manufacturing a heat exchanger member as described in the aforementioned items 2, 3, 4, and 5, particles containing flux can be adhered efficiently to the substrate.

According to the method of manufacturing a heat exchanger member as described in the aforementioned item 6, the flowability of the injection materials can be improved to evenly adhere the particles containing flux.

According to the method of manufacturing a heat exchanger member as described in the aforementioned items 7 and 8, a heat exchanger member excellent in corrosion resistance can be manufactured by adhering noncorrosive flux.

According to the method of manufacturing a heat exchanger member as described in the aforementioned item 9, the flowability of the injection material can be improved to thereby adhere the flux particles and the brazing particles evenly, and the brazeability can be improved as well.

According to the method of manufacturing a heat exchanger member as described in the aforementioned item 10, the flowability of the injection material can be improved to thereby adhere the flux particles and the Zn particles evenly, and a sacrificial corrosion layer can be formed, improving the corrosion.

According to the method of manufacturing a heat exchanger member as described in the aforementioned item 11, the flowability of the injection material can be improved to thereby adhere the flux particles, the brazing particles, and the Zn particles evenly, and the brazeability can be improved. Further, a sacrificial corrosion layer can be formed, improving the corrosion resistance.

According to the method of manufacturing a heat exchanger member as described in the aforementioned item 12, the die lines of the substrate can be eliminated.

According to the method of manufacturing a heat exchanger member as described in the aforementioned item 13, since the flux adhered by heating for the brazing melts to activate the surface of the substrate, excellent brazing can be performed.

According to the heat exchanger member as described in the aforementioned item 14, since the particles containing flux are adhered mechanically, no particle falls off during the handling, which enables an appropriate amount of flux to be supplied to the brazing portions by heating for the brazing, resulting in excellent brazing. Furthermore, since the flux particles adhere without interposing binder, no contamination of the brazing furnace will occur.

The heat exchanger member as described in the aforementioned item 15 enables supplying of a suitable amount of flux, which enables excellent brazing.

The heat exchanger member as described in the aforementioned item 16 is a tube, a header tank, or a flange excellent in brazeability.

DESCRIPTION OF THE REFERENCE NUMERALS

Figure 1:
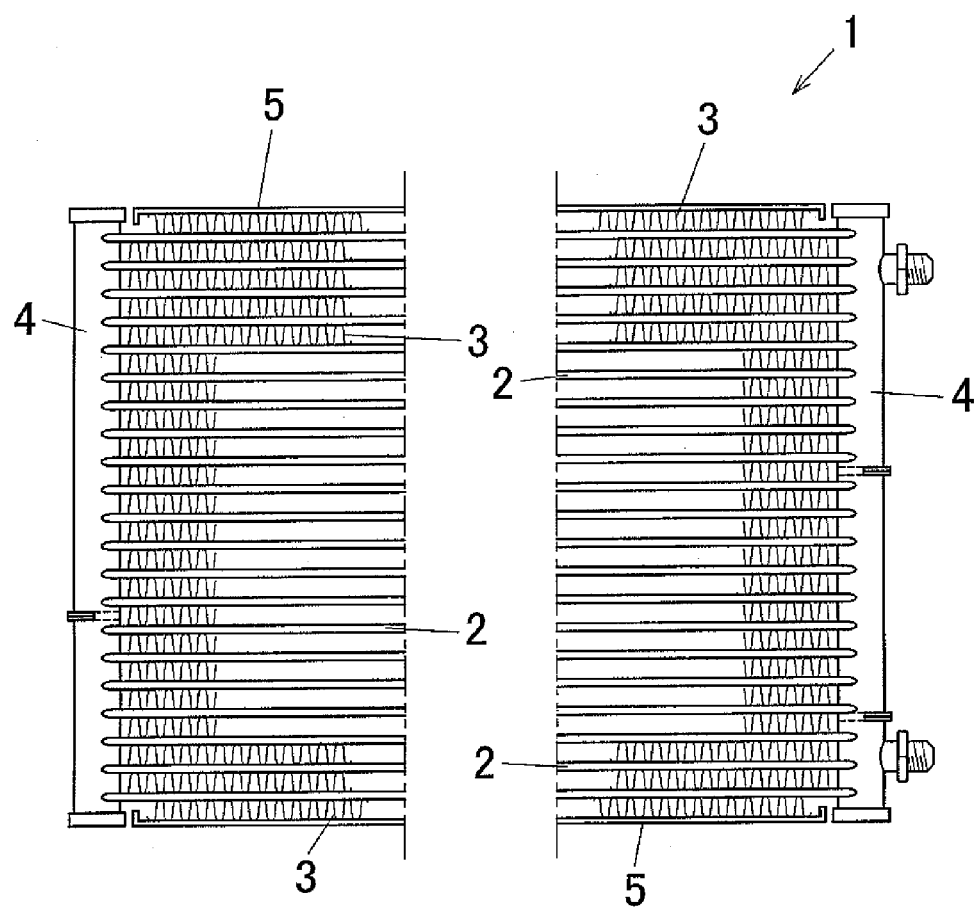
FIG. 1 is a front view showing an embodiment of a heat exchanger according to the present invention.

1: heat exchanger
2: heat exchanger tube (heat exchanger member)
2a: substrate (multi-passage flat tube)
3: fin
4: header tank
6: flange (heat exchanger member)
10: flux adhesion layer

BEST MODE FOR CARRYING OUT THE INVENTION

A heat exchanger member according to the present invention has a flux adhesion layer formed by injecting particles containing flux against a surface of a substrate at a high speed.

In the present invention, the heat exchanger member can be of any type. For example, in the heat exchanger 1 shown in FIG. 1, a core portion is formed by arranging tubes 2 and fins 3 alternately, connecting end portions of the tube 2 to header tanks 4 in fluid communication, and brazing the tubes 2 and fins 3 and the tubes 2 and header tanks 4. The heat exchanger member according to the present invention can be used as any one of the tube 2, the fin 3, and the header tank 4, and it is especially recommended to be used as the tube 2 or the header tank 4. In the heat exchanger 1 shown in FIG. 1, side plates 5 are brazed to the outermost fins 3.

Figure 5:
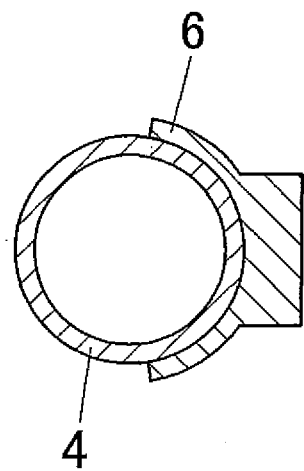
FIG. 5 is a cross-sectional view showing a flange that is a heat exchanger member according to the present invention.

The manufacturing method of the present invention can be used before brazing the heat exchanger member. The present invention can be applied to a member such as, e.g., a plate member or a tubular member before manufacturing a heat exchanger member, such as, e.g., a fin, a tube, or a header, as well as each heat exchanger member before brazing. Furthermore, it can also be applied to a flange 6 as a header tank supporting member shown in FIG. 5.

Figure 2:
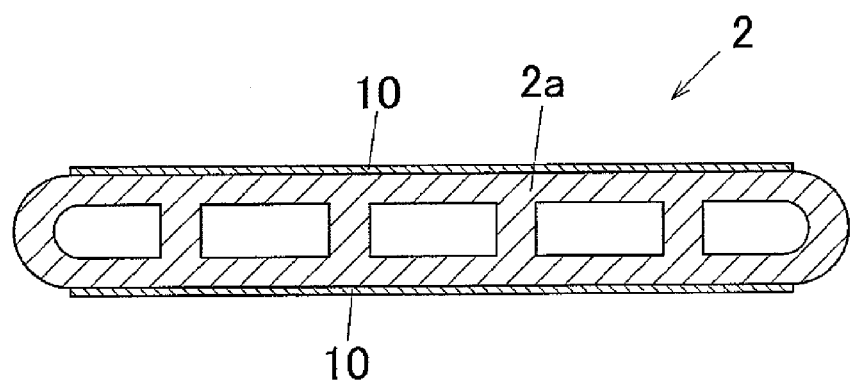
FIG. 2 is a cross-sectional view showing an embodiment of a heat exchanger member according to the present invention.

FIG. 2 shows a flat multi-passage heat exchanger tube as one example of a heat exchanger member according to the present invention. This heat exchanger tube 2 has a flux adhesion layer 10 on each of two opposing flat walls of the substrate 2a.

The flux adhesion layer 10 is formed by mechanical adhesion of particles containing flux to the substrate 2a. The mechanical adhesion denotes a state in which particles, such as flux, adhere directly to the substrate 2a without binder, and the mechanical adhesion can be attained by, for example, performing high-speed injection of particles containing flux to collide against the substrate 2a.

The flux adhesion layer 10 can be formed, for example, by injecting injection materials containing flux through an injection device nozzle at a high speed by carrier gas to collide particles such as flux against the surface of substrates 2a to cause adhesion of the particles thereof. The particles, such as, e.g., flux, collided with the substrate 2a mechanically adhere in a state in which they are flattened due to the impact, and an even flux adhesion layer 10 can be formed even with a small amount of adhesion. The particle for the injection material has a spherical shape or a shape closer to a spherical shape than the adhered particle, and will be deformed into a flat shape to be adhered, which covers a wider area than an area that can be covered by a particle adhered in a spherical shape. As a result, an even flux adhesion layer 10 is formed, which in turn can supply flux evenly to brazing portions.

As to the flux adhesion layer 10, the type of flux is not limited, but fluoride flux, such as, e.g., $KAlF_4$, $CsF$, $KZnF_3$, $KF$, $AlF_3$, $K_2AlF_5$, $K_3AlF_6$, $ZnF_2$, $LiF$, and $BiF_3$, are preferably used in terms of the fact that they are noncorrosive and improve the corrosion resistance of heat exchanger members, and it is more preferable to use at least one of $KAlF_4$ and $CsF$ in terms of the fact that their flux residue are noncorrosive. These fluxes allow the use of a single type of flux and the use of combination of plural types of fluxes mixed so as to set the melting point to be appropriate to the brazing temperature. For example, when the brazing temperature is 580 to 620° C., mixed flux containing $KAlF_4$ or $CsF$ as a main component is used. The adhesion amount of the flux is preferably 0.3 to 30 g/m$^2$ as the necessary amount for the activation of the brazing portion, more preferably 2 to 20 g/m$^2$.

To smoothly supply flux particles to an injection device to conduct even injection and form an even flux adhesion layer, it is preferred for the particles to have excellent flowability. Specifically, it is preferable that the particles are separated from each other and not clumped together. Flux used for aluminum brazing is generally high in moisture absorbency, and flux with high moisture content tends to become clumpy. Therefore, it is preferable to dry flux particles sufficiently to keep them in a state in which the particles are separated from each other. When the flux particles are separated from each other, the flux particles can be evenly supplied to an injection device and evenly injected to form an even flux adhesion layer 10. Specifically, it is preferable that the particles are supplied to an injection device with the moisture content of 2% or less, more preferably 1% or less.

Further, the flowability of the injection materials can be improved by mixing particles with good flowability to the flux particles to be injected, which in turn can form an even flux adhesion layer 10. As to the mixed quantity to improve the flowability, it is preferable to mix particles of 10-50 mass parts, more preferably 20-30 mass parts with respect to 100 mass parts of flux particles. As the particles to be mixed with flux to improve the flowability of injection materials, brazing particles and Zn particles can be exemplified, and the flowability can be improved by mixing at least one of them.

By mixing the brazing particles and/or Zn particles to the injection material, the flux adhesion layer becomes a layer containing these particles, which gives the following functions to the flux adhesion layer.

The heat exchanger member of the present invention is a member to be brazed to another member, and therefore the brazing material adhered to the surface of the substrate functions as bonding metal, which improves brazeability. The composition of the brazing material is not specifically limited, and can be Al—Si series alloy, for example. The preferred adhesion amount of the brazing material as a bonding metal is 3 to 80 g/m$^2$, more preferably 5 to 50 g/m$^2$. However, the brazing material needed for bonding can be supplied together with other members or separately, and therefore the brazing material within the flux adhesion layer can be an amount less than needed for bonding. Even if the amount of brazing material is insufficient for bonding, the effect of improving flowability of the injection material can be obtained.

By adhering Zn particles, a sacrificial corrosion layer is formed at the surface layer portion of the substrate by heating for the brazing, and the corrosion resistance of the heat exchanger member can be improved. Zn can be used as a simplex or a compound such as Al—Zn alloy, $KZnF_3$, $ZnF_2$, or $ZnCl_2$. The adhesion amount of Zn is preferably 0.5 to 20 g/m$^2$. Less than 0.5 g/m$^2$ of Zn fails to meet the sufficient amount for sacrificial corrosion, which makes it difficult to secure the corrosion resistance. If the amount of Zn exceeds 20 g/m$^2$, the fillet portion can corrode preferentially, and it is not economical. The more preferable adhesion amount is 1 to 15 g/m$^2$. The adhesion amount denotes a net amount of the element in either case of adhering the metal as a metal simplex, alloy, or a compound. For example, the amount of Zn is an amount less than needed for improving the corrosion resistance when adhering as Al—Zn alloy or $KZnF_3$. In the same manner as in the brazing material, the adhesion amount of Zn can be an amount less than needed to improve the corrosion resistance. Even if the amount is not enough to obtain sacrificial corrosion effects, effects to improve the flowability of injection materials can be obtained, and furthermore Zn can be added by, e.g., a method of injecting only Zn.

In the present invention, there is no need to adhere the flux particles to the entire surface of the substrate, and the particles can be partially adhered to the portions which need flux, in other words, only to the brazing scheduled portions. However, in cases where a sacrificial corrosive layer is formed by mixing Zn particles, the particles can be adhered to the portions even where brazing is not scheduled. In the case of partially adhering the particles, they can be adhered to the entire area of a portion of a surface, or they can be adhered to a portion of a surface. For example, in the flat tube 2 illustrated as an example, particles are adhered only to the two opposing flat walls to which fins will be brazed.

Further, the aforementioned adhesion amount of the flux is an amount on the adhesion area, and not an adhesion amount of the entire surface of the substrate. Similarly, the adhesion amount of the brazing material and Zn are both adhesion amount on the adhesion area.

Figure 3:
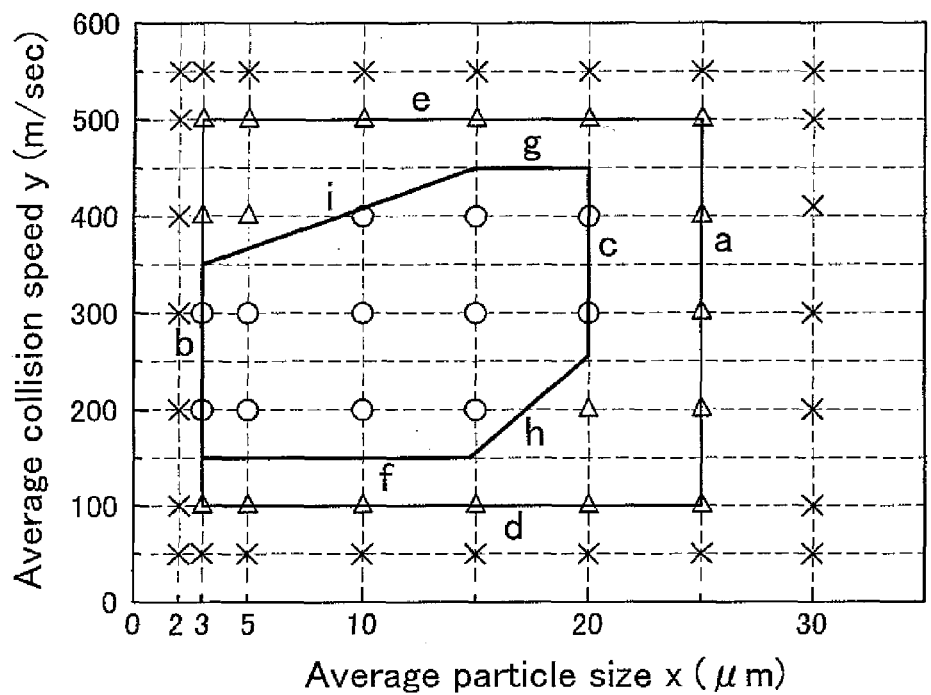
FIG. 3 is diagram showing the relationship between an average particle size and an average collision speed of flux particles in a manufacturing method of a heat exchanger member according to the present invention.

As the injection conditions of the injection materials containing flux, the following conditions can be recommended to adhere the particles efficiently. FIG. 3 shows the relationship between the average particle size x of the injection flux particles and the average collision speed y thereof. The injection conditions will be described in detail with reference to FIG. 3.

As to the injection flux particles, it is preferable to use an injection flux particles having an average particle size x of 25 μm or less (See (a) in FIG. 3). When the particle size is too large, it may become harder to adhere to the substrate 2a, which may result in deteriorated adhesion efficiency. The lower limit of the particle size of the injection flux particle is not specifically limited. When it becomes too small, however, the inertial force of the particle decreases, which may cause the flow velocity to slow down in the vicinity of the substrate 2a, which possibly lowers the adhesion efficiency. Therefore, it is preferable that the particle size is 3 μm or larger (see (b) in FIG. 3). It is especially preferable that the average diameter x of the injection flux particle is 3 to 20 μm (see (b) and (c) in FIG. 3).

The injection temperature is a factor that affects the deformation and the adhesion efficiency of the flux particles. If the injection temperature is too high, the flux may be denatured, which in turn may case deterioration of the function as flux. For this reason, it is necessary to perform the injection at a temperature below than the melting point of the flux by 30° C. or more, preferably 50° C. or more. The lower limit for the injection temperature is not limited, but adhesion can occur at around room temperature (25° C.). However, if the temperature is too low, the flux particles do not soften enough and the adhesion efficiency decreases, so it is preferable that the temperature difference with respect to the melting point of the flux is within 150° C. That is, the preferable injection temperatures are lower than the melting point of the flux by 30 to 150° C., more preferably 50 to 150° C. Further, in the present invention, the injection temperature denotes a particle temperature at the time of injection.

Further, the collision speed of the particle against the surface of the substrate $2a$ is a factor that affects the adhesiveness of the particle, and the average collision speed y against the surface of the substrate $2a$ is set to 100 m/sec or higher (see (d) in FIG. 3). When the average collision speed y is lower than 100 m/sec, there will be more particles that fall off without adhering, which is poor in adhesion efficiency and uneconomical. On the other hand, when the average collision speed becomes too fast, the substrate $2a$ may be deformed due to the impact at the time of the collision. Therefore, it is preferable that the speed is 500 m/sec or slower (see (e) in FIG. 3). It is more preferable that the average collision speed y falls within in the range of 150 to 450 m/sec (see (f) and (g) in FIG. 3).

Further, as the particle size of the flux particle increases, the adhesion efficiency of the flux particle is increased when making the flux particle collide against the substrate at a high speed, allowing a heat exchanger member to be manufactured efficiently. More specifically, from the aforementioned suitable range of the average particle size x and the average collision speed y of the flux particle, it is preferable that the average particle size x (μm) and the average collision speed y (m/sec) of the flux particles are set within the region enclosed by equations (b), (f), (h), (c), (g), and (i) in FIG. 3, in other words, within the region satisfying $x \geq 3$, $y \geq 150$, $y \geq 20x-140$, $x \leq 20$, $y \leq 450$, $y \leq 8.33x+325$.

In addition, the average particle size x of the particles can be measured with a particle size distribution measurement device, and the average collision speed y of the particles can be measured with a particle speed measurement device.

The aforementioned preferable average particle size and injection conditions of the flux particle are suitable conditions even when brazing material particles and/or Zn particles are mixed to the injection materials. Under the conditions, the adhesion efficiency of the brazing material particles and Zn particles become good.

The type of carrier gas for high speed injection of the injection flux particles is not specifically limited, but air, nitrogen gas, carbon dioxide, and argon gas can be exemplified. To prevent oxidization of the injection materials, it is preferable that the injection is performed especially in a non-oxidizing atmosphere, such as, e.g., a nitrogen gas atmosphere or an argon gas atmosphere.

Figure 4:
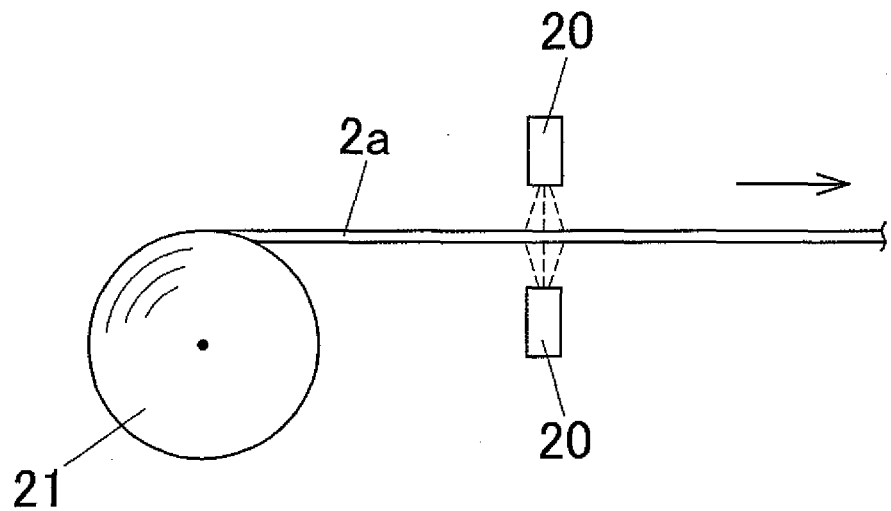
FIG. 4 is an explanatory view showing an example of nozzle arrangement of the injection device in an embodiment.

In manufacturing a heat exchanger tube 2 according to the present invention, after cutting a flat multi-passage tube as a base member into a size for a core assembly, a flux adhering layer 10 can be formed on the cut tube, or after forming a flux adhering layer 10 on a long base member, the base member can be cut into a predetermined length. For example, FIG. 4 shows a method in which a base member $2a$ of an extruded flat multi-passage tube is wound up in a coil, and then the coil 21 is unwound while continuously injecting particles containing flux onto both upper and lower surfaces of the traveling base member $2a$ through nozzles 20 of a fine particle injection device disposed above and below the base member $2a$. By continuously forming the flux adhesion layers 10 on the long base member $2a$, a tube 2 for heat exchangers can be manufactured efficiently.

The manufacturing method of the aforementioned base member is not specifically limited, but it is recommended to use an extruded member. Die lines are sometimes formed on an extruded member. However, die lines can be eliminated by high-speed injection of particles such as flux, and therefore occurrence of possible erosion due to inflow of brazing materials into die lines can be prevented. Therefore, there is of great significance of applying the manufacturing method of the heat exchanger member of the present invention to an extruded member.

In the heat exchanger member according to the present invention, the material of the substrate is not limited so long as it is aluminum or its alloy, and well-known materials can be used arbitrarily. As the tube material, JIS 1000 series aluminum alloy, aluminum alloy containing minute amount of Cu and/or Mn, and JIS 3000 series aluminum alloy can be recommended. Further, as the fin material, aluminum alloy in which Zn is added to JIS 3203 alloy can be recommended, and as the header tank material, JIS 3003 alloy can be recommended. Furthermore, as the flange material, JIS 3003 alloy and JIS 6063 alloy can be recommended.

In manufacturing the heat exchanger 1 of the illustrated embodiment, the heat exchanger tubes 1, the fins 3, and the header tanks 4 are heated for brazing in a provisionally assembled state. By this heating, the flux adhesion layer containing an appropriate amount of flux melts to activate the surface of the substrate, whereby each member is brazed preferably. The heating temperature at the time of brazing is preferably 580 to 620° C. The flux adhesion layer does not contain any inclusions such as binder, and therefore inclusions do not contaminate the brazing furnace and prevent the brazing, resulting in excellent brazing. Furthermore, since the flux particles are mechanically adhered, they will not fall off during the handling, which makes it possible to assuredly function the predetermined amount of adhered flux. Additionally, in the case of adhering the brazing material, the brazing material melts, resulting in excellent brazing. Further, in the case of adhering Zn, heating for the brazing causes formation of a sacrificial corrosive layer on the surface layer portion of the substrate, and the sacrificial corrosive layer makes the heat exchanger 1 excellent in corrosive resistance.

EXAMPLES

Test 1

Relationship Between Average Particle Size of Injection Flux Particle and Average Collision Speed Thereof <Manufacturing of Heat Exchanger Tube>
the material for the substrate $2a$ for the heat exchanger tube 2, JIS 1000 series aluminum alloy (consisting of Cu: 0.4 mass %, Mn: 0.2 mass %, the balance being Al and inevitable impurities) was used. An aluminum alloy billet of the aforementioned composition was subjected to soaking treatment and extruded into a multi-passage flat tube $2a$ having width 16 mm×height 3 mm×thickness 0.5 mm as shown in FIG. 2 from an extrusion device and wound up to a coil 21.

Next, as shown in FIG. 4, while unwinding the coil 21 with the nozzles 20 of the fine particle injection device disposed above and below the substrate $2a$, flux particles were injected at a high speed onto both upper and lower flat wall surfaces of the traveling multi-passage flat tube $2a$ to continuously form flux adhesion layers 10. As the flux, the flux A shown in Table 1 which was dried so that the moisture content became 1% was used. Injection flux particles of eight sizes: 2 μm, 3 μm, 5 μm, 10 μm, 15 μm, 20 μm, 25 μm, and 30 μm were injected at seven speed levels: 50 m/sec, 100 m/sec, 200 m/sec, 300 m/sec, 400 m/sec, 500 m/sec and 550 m/sec in total of fifty five (56) combinations to thereby form flux adhesion layers 10. All other conditions were the same, the coil traveling speed was constant, and the injection temperature was set to 500° C. The difference between the injection temperature and the melting point of the flux was 62° C.

TABLE 1

| Flux symbol | Composition | Melting point (° C.) |
|---|---|---|
| A | Mixed flux containing $KAlF_4$ as a main component | 562 |
| B | Mixed flux containing CsF as a main component | 480 |

The multi-passage flat tube 2a with the flux adhesion layers 10 was cut into a predetermined length to obtain a heat exchanger tube 2.

<Manufacturing of Heat Exchanger and Brazeability>

The tubes 2, the brazing fins 3, and the header tanks 4 for the heat exchanger were provisionally assembled and brazed to obtain a heat exchanger 1 shown in FIG. 1. The heating for the brazing was set to 600° C.×10 minutes.

In each of the brazed heat exchangers, the bonding rate of the tube 2 and the fin 3 was evaluated by the following three-level rating to evaluate the brazability. The results are shown in FIG. 3.

○: 95% or above

Δ: 80% or above, but below 95% x: below 80%

From the results regarding the brazeability shown in FIG. 3, it is understood that excellent brazing can be performed by adhering an appropriate amount of flux when the average particle size of the flux particle is 3 to 25 μm and the average collision speed is 100 to 500 m/sec at the time of injection, that is, within the region surrounded by the equations (a), (b), (c) and (d). The brazeability was much better in the region surrounded by equations (b), (f), (h), (c), (g) and (i).

Test 2

Heat Exchanger Tube Having Various Flux Adhesion Layers

<Manufacturing of Heat Exchanger Tube>

A multi-passage flat tube 2a extruded by the same method as in TEST 1 was wound up to a coil 21, and as shown in FIG. 4, while unwinding the coil, various injection materials were injected at a high speed onto both upper and lower flat wall surfaces of the traveling multi-passage flat tube 2a to form flux adhesion layers 10.

As the injection materials, one of fluxes selected from Table 1, Si alloy particles of Al-10 mass % as a brazing material, and Zn particles as Zn were dried so that the moisture content of the flux became 1%, and thereafter one of or two or more materials shown in Table 2 were added. The composition, particle size and injection conditions for the injection materials used in each of Examples and Comparative Examples are shown in Table 2.

A flax adhesion layer 10 was formed on each of the upper and lower flat walls of the multi-passage flat tube 2a by the high-speed injection of the injection materials. The amounts of the adhered flux, the brazing material and Zn became the amounts shown in Table 2. The multi-passage flat tube 2a on which flux adhesion layers 10 were formed was cut into a predetermined length to obtain a heat exchanger tube 2.

<Manufacturing of Heat Exchanger>

The manufactured tubes 2, brazing fins 3, header tanks 4 for the heat exchanger in each Example were provisionally assembled and brazed to manufacture the heat exchanger 1 shown in FIG. 1. The brazing heating was conducted at 600° C. for 10 minutes.

<Brazeability>

In the same manner as in TEST 1, for each of the brazed heat exchangers, brazeability was evaluated by three-level rating based on the bonding rate of the tube and the fin. The evaluation results are shown in Table 2.

Furthermore, the brazed heat exchangers of Example 6 and Example 8 on which flux adhesion layers containing Zn were formed were evaluated for the corrosion resistance based on the following experimental method and criteria.

<Corrosion Resistance>

Each of the manufactured heat exchangers was subjected to a SWAAT test defined by ASTM-G85-A3. As the corrosive test solution, artificial sea water produced in accordance with ASTM D1141 and added by acetic acid to adjust to pH3 was used. The test was conducted for 480 hours by repeating a cycle of 0.5 hour-spraying-1.5 hour-moistening.

The corrosive resistance was evaluated using the following criteria after the corrosive test.

○: Excellent brazing with no erosion and no preferential fillet corrosion

TABLE 2

| | | Injection Material | | | | Injection condition | | Adhesion amount for flux adhesive layer (g/m²) | | | Evaluation | |
|---|---|---|---|---|---|---|---|---|---|---|---|---|
| | | Components | | | Average particle size (μm) | Difference between melting point of flux and temperature (degrees Celsius) | Average collision speed (m/sec) | | | | | |
| | | Flux symbol | Brazing material | Zn | | | | Flux | Brazing material | Zn | Brazeability | Corrosion Resistance |
| Ex. | 1 | A | none | none | 5 | 50 | 200 | 3 | | | ○ | |
| | 2 | A | none | none | 10 | 60 | 250 | 5 | | | ○ | |
| | 3 | A | none | none | 15 | 30 | 150 | 3 | | | ○ | |
| | 4 | B | none | none | 10 | 100 | 100 | 5 | | | Δ | |
| | 5 | A | none | none | 20 | 120 | 500 | 15 | | | Δ | |
| | 6 | A | contained | contained | 25 | 60 | 200 | 5 | 20 | 10 | ○ | ○ |
| | 7 | A | contained | none | 10 | 60 | 200 | 10 | 20 | | ○ | |
| | 8 | A | none | contained | 5 | 60 | 200 | 3 | | 5 | ○ | ○ |

TABLE 2-continued

| | | Injection Material | | | Injection condition | | Adhesion amount for flux adhesive layer (g/m²) | | | Evaluation | |
|---|---|---|---|---|---|---|---|---|---|---|---|
| | | Components | | | Average particle size (μm) | Difference between melting point of flux and temperature (degrees Celsius) | Average collision speed (m/sec) | | | | |
| | | Flux symbol | Brazing material | Zn | | | | Flux | Brazing material | Zn | Brazeability | Corrosion Resistance |
| Com. | 1 | A | none | none | 20 | 50 | 50 | 0.1 | | | x | |
| EX | 2 | A | none | none | 15 | 0 | 200 | 3 | | | x | |

From the results in Table 2, it is understood that in the heat exchanger tube of each Example, an appropriate amount of flux can be adhered by high-speed injection of particles containing flux and excellent brazing was achieved. Furthermore, the corrosive resistance was improved by adhering Zn.

Test 3

Moisture Content Amount of Flux Particles

A multi-passage flat tube 2a extruded by the same method as in TEST 1 was wound up to a coil 21, and as shown in FIG. 4, while unwinding the coil, various injection materials were injected at a high speed onto both upper and lower flat wall surfaces of the traveling multi-passage flat tube 2a to form flux adhesion layers 10.

As the flux particle, A (average particle size: 5 μm) in Table 1 was used and the moisture content was adjusted as shown in Table 3. The injection conditions and flux adhesion amount were the same as those in Example 1 of TEST 2.

Next, the supply performance (sending performance) of the flux particles to the high speed injection device and the evenness of the formed flux adhesion layer were evaluated by the following criteria.

○: Flowability of the flux particles was excellent and the flux particles were evenly supplied to the high speed injection device to conduct extremely stable injection. Also, extremely even flux adhesion layer was formed.

Δ: Supplying performance and injection stability of the flux particles were good although they were slightly inferior to the rating of "○", and even flux adhesion layers were formed.

TABLE 3

| | Moisture content of flux particle (%) | Supplying performance of flux particle Evenness of flux adhesion layer |
|---|---|---|
| Example 11 | 0.1 | ○ |
| Example 12 | 0.5 | ○ |
| Example 13 | 1 | ○ |
| Example 14 | 6 | Δ |

From the results shown in Table 3, it is confirmed that, by increasing the flowability of the flux particles by limiting the moisture content thereof, the supply performance of the particles and the injection stability increase and more even flux adhesion layers could be formed.

This application claims priority to Japanese Patent Application No. 2007-325519 filed on Dec. 18, 2007, and the entire disclosure of which is incorporated herein by reference in its entirety.

It should be understood that the terms and expressions used herein are used for explanation and have no intention to be used to construe in a limited manner, do not eliminate any equivalents of features shown and mentioned herein, and allow various modifications falling within the claimed scope of the present invention.

INDUSTRIAL APPLICABILITY

The heat exchanger member manufactured using the method of the present invention enables even supplying of flux to the brazing portions and has excellent brazeability, and therefore can suitably be used as a component for various kinds of heat exchangers.

The invention claimed is:

1. A method of manufacturing a heat exchanger member, characterized in that particles containing at least flux are injected to a surface of a substrate made of aluminum or its alloy at a temperature lower than a melting point of the flux by 30° C. or more to collide against the surface at an average speed of 100 m/sec or higher to cause mechanical adhesion of the particles to the surface; and
wherein an average particle size x (μm) of the injection flux particles and an average collision speed y (m/sec) thereof fall within a range satisfying $x \geq 3$, $y \geq 150$, $y \geq 20x - 140$, $x \leq 20$, $y \leq 450$, and $y \leq 8.33x + 325$.

2. The method of manufacturing a heat exchanger member as recited in claim 1, wherein the particles containing at least flux are injected at a temperature lower than the melting point of the flux by 50 to 150° C.

3. The method of manufacturing a heat exchanger member as recited in claim 1, wherein a moisture content of the flux particles is 2% or less.

4. The method of manufacturing a heat exchanger member as recited in claim 1, wherein the flux is fluoride series flux.

5. The method of manufacturing a heat exchanger member as recited in claim 4, wherein the flux contains at least one of $KAlF_4$ and $CsF$.

6. The method of manufacturing a heat exchanger member as recited in claim 1, wherein the particles containing at least flux is a compound of flux particles and brazing particles.

7. The method of manufacturing a heat exchanger member as recited in claim 1, wherein the particles containing at least flux is a compound of flux particles and Zn particles.

8. The method of manufacturing a heat exchanger member as recited in claim 1, wherein the particles containing at least flux is a compound of flux particles, brazing particles, and Zn particles.

9. The method of manufacturing a heat exchanger member as recited in claim 1, wherein the substrate is an extruded member.

10. A method of manufacturing a heat exchanger in which tubes and fins are stacked alternately and header tanks are connected to the tubes to form a provisionally assembled core portion, and the provisionally assembled core portion is heated to thereby braze the tubes and the fins, and the tubes and the header tanks, characterized in that using a member in which particles containing at least flux mechanically are adhered on a surface of a substrate made of aluminum or its alloy by injecting the particles to the surface at a temperature lower than a melting point of the flux by 30° C. or more to collide at an average speed of 100 m/sec or higher, as any one of the tube, the fin, and the header tank, and brazing is performed by melting the adhered flux by heating for the brazing to activate the surface of the substrate by the molten flux; and wherein an average particle size x (μm) of the injection flux particles and an average collision speed y (m/sec) thereof fall within a range satisfying x≥3, y≥150, y≥20x−140, x≤20, y≤450, and y≤8.33x+325.

* * * * *